United States Patent [19]
Lace

[11] Patent Number: 5,493,469
[45] Date of Patent: Feb. 20, 1996

[54] SURGE PROTECTION FOR DATA LINES

[75] Inventor: Melvin A. Lace, Prospect Heights, Ill.

[73] Assignees: Mildred A. Lace, Mount Prospect; a part interest; Thomas E. Dorn, Clarendon Hills; a part interest

[21] Appl. No.: 754,064

[22] Filed: Sep. 3, 1991

Related U.S. Application Data

[63] Continuation-in-part of Ser. No. 642,799, Jan. 18, 1991, abandoned.

[51] Int. Cl.⁶ .................................................. H02H 9/06
[52] U.S. Cl. .......................... 361/119; 361/56; 361/113; 361/127
[58] Field of Search ..................... 361/56, 91, 111, 361/119, 127, 126, 128, 129, 130, 113

[56] References Cited

U.S. PATENT DOCUMENTS

| | | | |
|---|---|---|---|
| 3,973,224 | 8/1976 | Gaule et al. | 361/113 |
| 4,079,211 | 3/1978 | Janssen . | |
| 4,161,008 | 7/1979 | Zimmermann et al. . | |
| 4,254,442 | 8/1981 | Dijkmans et al. . | |
| 4,449,157 | 5/1984 | Chow . | |
| 4,586,104 | 4/1986 | Standler . | |
| 4,632,762 | 11/1986 | Boeckmann et al. . | |
| 4,661,878 | 4/1987 | Brown et al. . | |
| 4,675,772 | 6/1987 | Epstein . | |
| 4,695,916 | 9/1987 | Satoh et al. . | |
| 4,758,920 | 7/1988 | McCartney . | |
| 4,808,843 | 2/1989 | Hedin | 361/113 |
| 4,849,846 | 7/1989 | Hung et al. . | |
| 4,878,145 | 10/1989 | Lace . | |
| 4,887,180 | 12/1989 | Climent et al. | 361/56 |
| 4,941,063 | 7/1990 | McCartney et al. | 361/119 |

*Primary Examiner*—Todd DeBoer
*Attorney, Agent, or Firm*—Dorn, McEachran, Jambor & Keating

[57] ABSTRACT

Surge protection for a data transmission line, typically a telephone line including two data signal conductors, incorporates a primary protector circuit for high voltage, high energy surges and a secondary protector circuit for low voltage surges. The primary protector circuit includes a normally non-conductive "breakdown" or "crowbar" device having a high breakdown voltage, a solid-state triac, or a thyristor, driven conductive by a surge exceeding its breakdown voltage; the crowbar device is connected from one or both conductors to ground. An inductance is connected in the circuit to extend the time in which the circuit reduces a surge to near zero voltage, and thus dissipates power from the surge. The second protector circuit includes at least one avalanche diode, Zener diode, or other threshold device in parallel with the primary protector circuit. The threshold device(s) in the secondary circuit have thresholds much lower than the primary breakdown voltage; typical values are ten to seventy volts for the threshold devices and two to three hundred volts for the primary breakdown devices. In all instances, impedances, particularly resistances, in series in the data signal conductors are avoided. The spacing between the primary and secondary protector circuits is at least two meters.

68 Claims, 5 Drawing Sheets

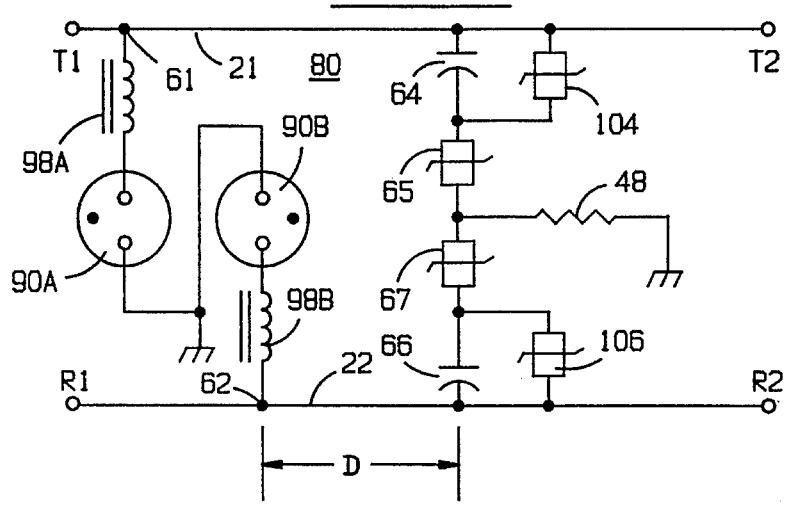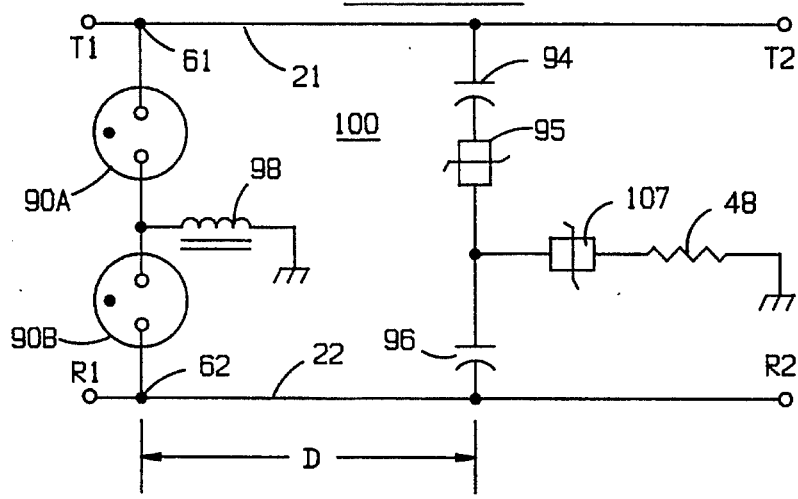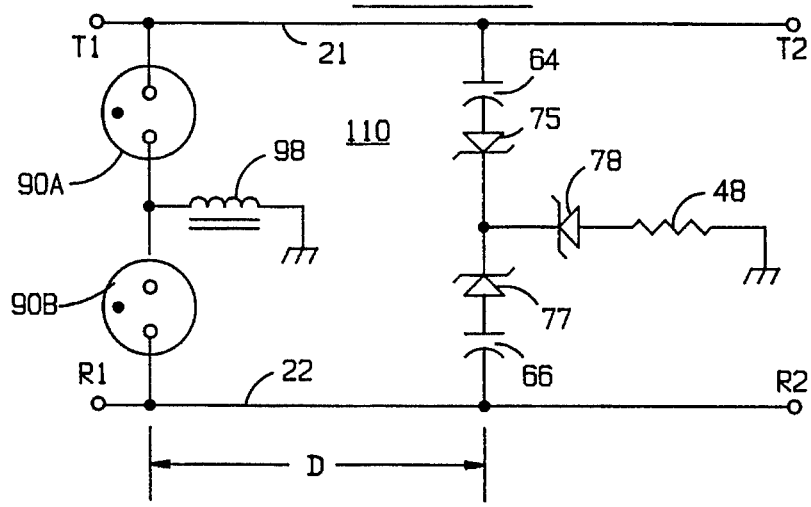

5,493,469

1

SURGE PROTECTION FOR DATA LINES

This is a continuation-in-part of M. A. Lace application Ser. No. 07/642,799, filed Jan. 18, 1991, now abandoned.

BACKGROUND OF THE INVENTION

A variety of different protector circuits have been utilized to limit damage to data transmission lines, particularly telephone lines, due to lightning strikes and other voltage surges on the lines. The primary surge protector circuits and for data transmission lines customarily have utilized one or more "breakdown" or "crowbar" devices that are normally non-conductive but that are driven conductive by a voltage surge exceeding a predetermined breakdown voltage. Some of these devices are bidirectional, as is the case with carbon blocks, gas tubes, and solid-state triacs. Other, such as thyristors, may be unidirectional. The breakdown voltage is frequently about 250 volts; other breakdown levels may be selected.

Known primary surge protector circuits usually allow the voltage on a transmission line conductor to rise very rapidly when a lightning strike or other surge occurs on the line, until the breakdown voltage of the gas tube, triac, or other crowbar device goes conductive, and the impedance from the data conductor to ground or to some other reference potential reduces very rapidly. Indeed, the impedance to ground is usually reduced to near zero in a matter of nanoseconds, with the result that the voltage on the conductor is reduced to near zero potential with extreme rapidity.

The extremely rapid reduction in the impedance of the path from the data transmission conductor to ground through the gas tube or other breakdown device is undesirable because it does not provide for the dissipation of an appreciable amount of energy from the voltage surge during the time that the voltage on the struck conductor goes from the breakdown voltage of the crowbar device to ground potential. As a consequence, and because this energy must go somewhere, the primary protector circuit may not be as effective as desired in protecting equipment connected to the line at a location closely adjacent to the protector.

Voltage surges on data transmission lines that are well below the breakdown voltage of a primary protector circuit may nevertheless cause substantial damage, particularly in those instances when the surge entails a substantial energy content. This is also true of some voltage surges that would be of sufficient amplitude to drive the primary protector circuit to conduction but that are of extremely short duration. As a consequence, a primary protection circuit is frequently paired with a secondary protector circuit that employs one or more normally non-conductive threshold device that become conductive when stressed above a given threshold voltage that is still well below the breakdown voltage for the primary protector. Typically, for a two hundred fifty volt primary breakdown voltage the threshold voltages in the secondary protector may be in a range of about ten to seventy volts, always in series with a resistor or capacitor.

Some rather effective secondary protectors have been constructed as R/C filters; the filter resistance is in series in the data conductor, the capacitance in a shunt circuit. But these secondary protectors present appreciable problems in meeting safety standards, due to the presence of the resistance in the data signal conductors, and hence are unsatisfactory in some applications. The problem can be alleviated by use of positive thermal coefficient resistors, but this expedient is rather costly.

2

A common technique has been to provide a composite surge protection apparatus, incorporating primary and secondary protection circuits in one package. This is convenient with respect to space requirements and cost, but is not particularly desirable from the standpoint of effective overall protection.

SUMMARY OF THE INVENTION

It is a principal object of the present invention, therefore, to provide a new and improved primary surge protector for a telephone line or other data transmission line that materially increases the period of time over which a voltage surge on one of the data conductors is brought to ground or to another plane of reference potential.

Another object of the invention is to provide a new and improved combination primary and secondary surge protector for a data transmission line of the kind that includes first and second data signal conductors, a combined surge protector which introduces no resistance into the signal conductors, and which is simple and inexpensive in construction yet highly reliable and effective in operation.

A further object of the invention is to provide new and improved secondary surge protection circuits that can be used alone or in combination with primary protection circuits, with minimum spacing between the combined circuits for improved performance.

Accordingly, in one aspect the invention relates to a surge protector for a data transmission line including a data signal conductor. The surge protector comprises a normally non-conductive "crowbar" device, such as a gas tube or a triac, that becomes conductive when subjected to a predetermined breakdown voltage, and connector means for connecting the crowbar device between the data signal conductor and a reference potential (e.g., ground) in a circuit configuration such that, in the event of a voltage surge on the data signal conductor exceeding the breakdown voltage, the crowbar device is driven conductive and establishes a low impedance path from the data signal conductor to the reference potential. An inductive reactance is connected to the crowbar device, in series in the low impedance path, to materially increase the effective impedance in the path for a brief interval after the crowbar device is driven conductive. The surge protector includes no appreciable resistance in series with the data conductor.

In another aspect, the invention relates to a combined primary/secondary surge protector for a data transmission line including first and second data signal conductors. The combined surge protector comprises a blocking-diode bridge having first and second anode-cathode terminals, a third anode—anode terminal, and a fourth cathode—cathode terminal, and two blocking diodes external to the bridge; each of the first and second bridge terminals is connected to one of the data signal conductors and each of the third and fourth bridge terminals is connected to a reference potential through one of the two external blocking diodes. A normally non-conductive threshold device is connected across the third and fourth bridge terminals, the threshold device having a threshold voltage approximately in the range of ten to seventy volts, and a normal non-conductive crowbar device is connected across the third and fourth bridge terminals, the crowbar device having a breakdown voltage approximately in the range of two hundred to three hundred volts. The surge protector has no appreciable resistance in series with either data conductor.

BRIEF DESCRIPTION OF THE DRAWINGS

FIGS. 6 through 13 are schematic diagrams of surge protectors each constituting another embodiment of the invention.

DESCRIPTION OF THE PREFERRED EMBODIMENTS

Figure 1:
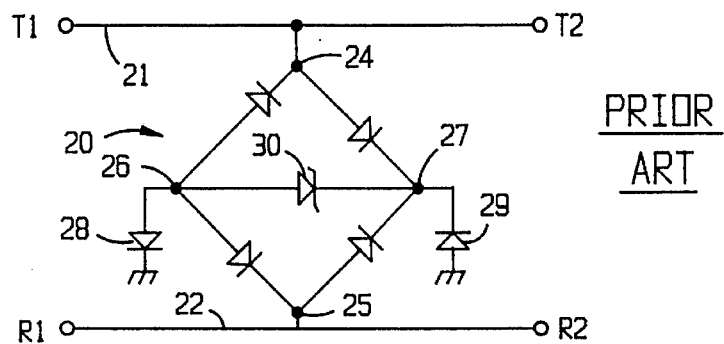
FIG. 1 is a schematic circuit diagram of a previously known primary surge protector circuit for a telephone line.

FIG. 1 illustrates a previously known primary surge protector circuit 20 for a data transmission line that includes first and second data signal conductors 21 and 22. Conductor 21 is shown as having terminals T1 and T2; conductor 22 has terminals R1 and R2. The data transmission line 21,22 may be of virtually any length. Ordinarily, the primary surge protector circuit 20 has been located near one end of the transmission line and has been used by itself rather than in combination with an additional low-voltage (secondary) protection circuit. Telephone signals or other data transmission may proceed in either direction or in both directions on line 21,22. In commercial form, the surge protector 20 may constitute a package including everything between the terminals T1, T2, R1, R2, and even a ground conductor (not shown). But it is the primary surge protector circuit 20 that functions to protect the transmission line.

The conventional primary surge protector circuit 20 of FIG. 1 includes a diode bridge 23 having a first anode-cathode terminal 24 that is connected to the first data signal conductor 21 and a second anode-cathode terminal 25 that is connected to the second conductor 22 of the transmission line. The bridge has an anode—anode terminal 26 connected to a reference potential, here shown as ground, through a first blocking diode 28. The bridge in protector circuit 20 also has a cathode—cathode terminal 27 that is connected to ground through another blocking diode 29.

Surge protector 20 further comprises a "crowbar" or "breakdown" device 30 that is connected across bridge terminals 26 and 27. Thus, device 30 is connected to the first data signal conductor 21 through terminals 26 and 24 of the bridge, and is also connected to the other signal conductor 22 through the bridge terminals 26 and 25. Device 30 is also connected to conductor 21 via bridge terminals 27 and 24 and to conductor 22 through bridge terminals 27 and 25. The terminals of the crowbar device 30 are also connected to ground through terminals 26 and 27 and the two blocking diodes 28 and 29, respectively.

The breakdown device 30 may constitute a gas tube or a solid-state device. For conventional telephone line use, device 30 has usually had a breakdown voltage in a range of about two hundred to three hundred volts; a thyristor having a breakdown voltage of two hundred fifty volts is often used. Other such devices having different breakdown voltages appropriate to other kinds of transmission lines may be utilized. Similarly, if a triac or other solid-state device is used as the crowbar device 30, in FIG. 1, its breakdown voltage should again be of the order of two hundred fifty volts for a conventional telephone line, or such other value as is appropriate to the data transmission line to be protected. For any type of device 30, the breakdown voltage is the rating for the device, the voltage at which the device is driven conductive to establish a very low impedance path between the bridge terminals 26 and 27. In the absence of any high voltage condition on either or both of lines 21 and 22, device 30 affords a very high impedance, for all practical purposes an infinite impedance, between bridge terminals 26 and 27.

Figure 2:
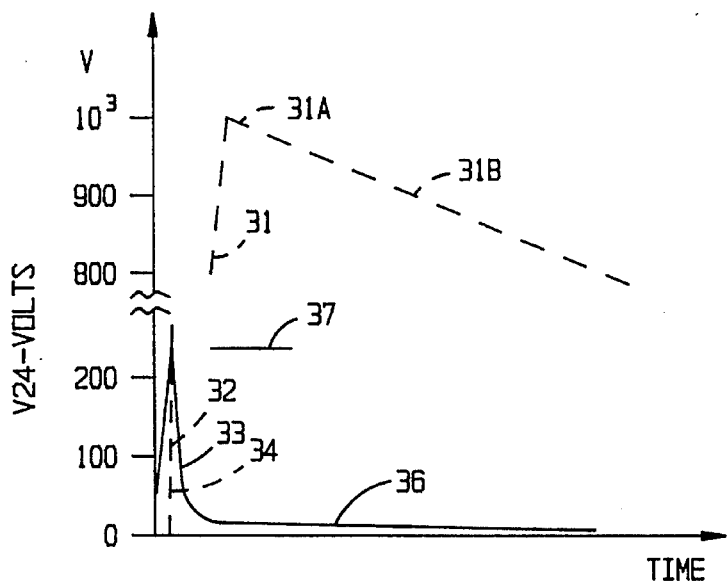
FIG. 2 is a graphical representation of the response of the circuit of FIG. 1 to a voltage surge on one of the two data signal conductors.

If it is assumed that a lightning strike or other high voltage surge occurs on the first data transmission conductor 21, the voltage at terminal 24 (FIG. 1) increases very rapidly, as illustrated by dash line 31 in FIG. 2. The surge voltage might, for example, reach a level of one kilovolt in a very short time, as indicated by the curve 31. Having reached its peak 31A, assuming no protective device such as device 20 is present, the voltage on line 21 (V24) would deteriorate slowly as also indicated by the continuation of the curve, line 31B. It should be recognized that FIG. 2 applies equally for a surge of either positive or negative polarity. FIG. 2 also applies if the voltage surge is on conductor 22 instead of data line 21, or if the voltage surge occurs simultaneously on both of the conductors 21 and 22, as often happens.

With the prior art protective device 20 in position between lines 21 and 22, as shown in FIG. 1, however, an abrupt increase in potential on line 21, and hence in the potential V24 at terminal 24, quickly exceeds the breakdown voltage for crowbar device 30, assumed to be two hundred fifty volts (level 37, FIG. 2). As a consequence, device 30, FIG. 1, becomes conductive. When this happens, again assuming a positive-going surge on line 21, a high current of rapidly increasing amplitude begins to flow from terminal 24 through terminal 27 to device 30 and then to bridge terminal 26 and to ground through diode 28. The surge current is effectively blocked by the diode between bridge terminals 24 and 26 so that it cannot bypass the breakdown device 30 through that branch. The diode in the bridge between terminals 27 and 25 also precludes the surge current flowing through that branch of the bridge. Blocking diode 29 precludes the surge current from going directly to ground without traversing the thyristor, gas tube, triac, or other crowbar device 30.

When the lightning strike or other high voltage surge occurs, as assumed, on transmission line conductor 21, the voltage V24 at terminal 24 rises sharply as indicated by solid line 32 in FIG. 2. At the breakdown voltage 37 device 30 is driven conductive; as a consequence, a very low impedance path is established through the crowbar device 30 and the voltage drops very rapidly to near zero, as indicated by solid line 33 in FIG. 2. Thereafter, the voltage level may oscillate a few times, but the basic voltage is maintained at nearly zero, as indicated by curve 36. As is apparent from FIG. 2, the descending voltage portion 33 of the curve varies only slightly from a truly vertical, zero-time characteristic as represented by the dash line 34. As a consequence, the area 35 under the curve 32,33 is relatively small. This area is representative of the energy dissipated in the surge protector 20 after it reduces the surge to zero. A substantial amount of energy is left to be dissipated; virtually no net dissipation occurs in the surge protector circuit 20 after it reduces the voltage V24 to zero. As a consequence, a voltage surge representing a high energy level can still damage communication equipment connected to the transmission line 21,22, or may even damage the transmission line itself, despite the presence of the conventional surge protector 20. Surge protector 20 functions in the same way for a negative going surge on conductor 21 and for either positive or negative going surges on conductor 22.

Figure 3:
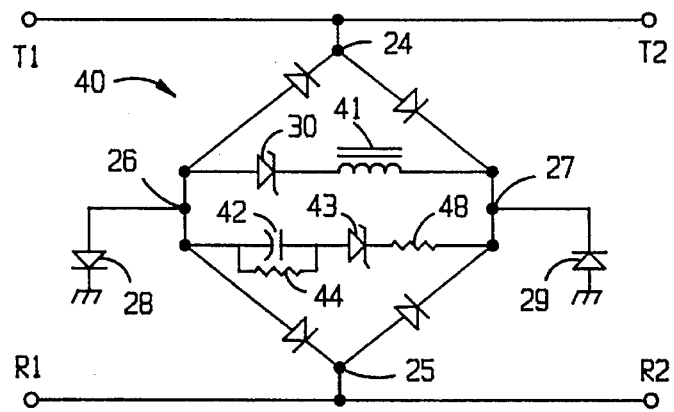
FIG. 3 is a schematic diagram of a primary surge protector similar to the circuit of FIG. 1 but comprising one embodiment of the present invention.

The primary/secondary surge protector 40 shown in FIG. 3 incorporates all of the elements of the conventional protector 20 of FIG. 1 but with additional circuit elements so that, overall, the primary protector circuit 40 provides for much slower current decay and hence much greater energy dissipation in the time interval immediately following a high voltage surge on either of the two signal conductors 21 and 22 of the data transmission line. Thus, the primary protector 40, constructed in accordance with one embodiment of the present invention, .includes a diode bridge with its terminals 24,25,26 and 27 connected in the same manner as before to the first and second data transmission conductors 21 and 22, to the breakdown device 30, and to ground through the blocking diodes 28 and 29.

Protector 40, however, includes an inductive reactance 41 connected in series with the primary breakdown device 30. In the preferred construction illustrated in FIG. 3, the inductor 41 is in series with the crowbar device 30 in a circuit between bridge terminals 26 and 27. A capacitor 42, on the other hand, is connected in series with a low-voltage threshold device 43, preferably a Zener diode, in a circuit that is parallel with the series combination of crowbar device 30 and inductor 41. That is, the series circuit comprising capacitor 42 and diode 43 is also connected across the bridge terminals 26 and 27. Circuit 40 further includes a resistor 44 connected in parallel with capacitor 42 and may include yet another resistor 48 connected in series with capacitor 42 and threshold device 43.

Figure 4:
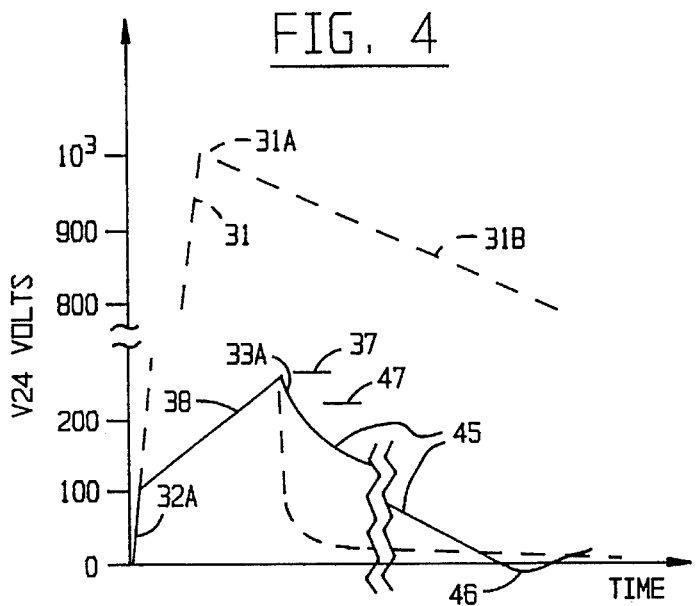
FIG. 4 is a graph, like FIG. 2, illustrating operation of the circuit of FIG. 3.

The operation of surge protector circuit 40, FIG. 3, is substantially different from that of the conventional primary surge protector 20 of FIG. 1, as is graphically illustrated in FIG. 4, particularly when compared with FIG. 2. If it is assumed that a lightning strike or other high voltage surge occurs at some location on signal conductor 21, surge protector 40 initially behaves in the same manner as surge protector 20. That is, the voltage V24 at terminal 24 initially rises very rapidly (FIG. 4, line 32A) because crowbar device 30 is non-conductive and, accordingly, there is no low impedance path to ground. Even before the voltage reaches the breakdown level 37 for the crowbar device, however, at some lower voltage 38 the rising voltage reduces its rate of increase, as illustrated by curve 38, due to the presence of circuit elements 41–44 in protector 40. When the crowbar device 30 does go conductive, at voltage 37 (FIG. 4) the voltage at V24 terminal 24 drops precipitously as indicated by curve 33A, corresponding to the top-portion of curve 33 in FIG. 2.

A further difference in operation occurs, however, when the voltage drop below level 37 exceeds the threshold voltage of the secondary threshold device, the Zener diode 43. When this occurs, the threshold device 43 breaks down and becomes conductive; this occurs at the voltage level 47 in FIG. 4. From that point on, due to the presence of circuit elements 41,42,44, and 48, the overall voltage at terminal 24 (or terminal 27) drops much more slowly, as indicated in FIG. 4 by line 45. After a brief time interval the voltage V24 reaches the zero level, frequently with some small fluctuations 46. But the time interval for the decreasing voltage 45 to reach zero (FIG. 4) is much longer than for the previously discussed conventional protector 20, FIG. 2, and the area under the V24 curves 32A, 38 and 45 of FIG. 4 is much larger than the area under the curves 32,33 in FIG. 2, indicating that a much larger energy dissipation has occurred in the case of protector 40 than for protector 20. This is a principal basis for the marked improvement in performance afforded by the present invention.

Figure 5:
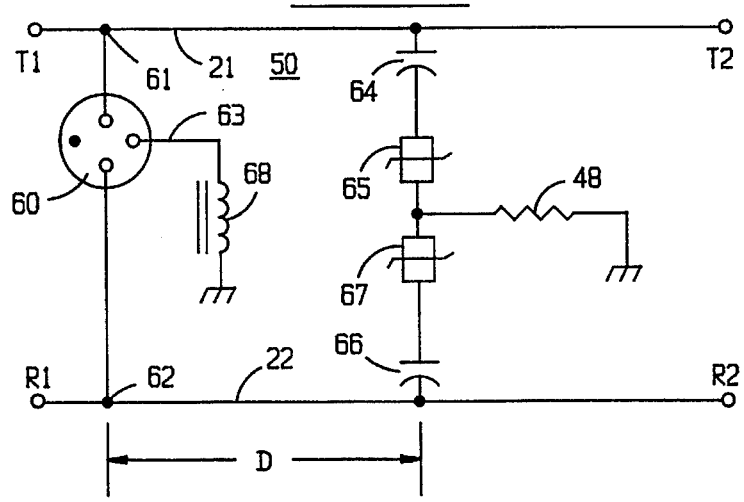
FIG. 5 is a schematic diagram of combined primary and secondary surge protector circuits constructed in accordance with a further embodiment of the invention.

FIG. 5 illustrates a combined primary/secondary surge protector circuit 50 that employs a substantially different circuit from the protector 40 of FIG. 3; the two surge protectors 40 and 50, however, have much in common and both provide advantages in operation and manufacture as compared with the prior art. Both afford the mode of operation shown in FIG. 4. As before, the protector circuit 50 is employed to protect a telephone line or other data transmission line including two data signal conductors 21 and 22. The first conductor 21 has terminals T1 and T2; the other conductor 22 has terminals R1 and R2. Data signals may flow in either direction, or both, on each conductor.

The primary/secondary surge protector 50, FIG. 5, includes a crowbar device 60 that is shown as a three-terminal gas discharge tube. Two of the discharge electrodes of tube 60 are connected to the data transmission lines 21 and 22 as indicated at points 61 and 62. The third electrode of the gas tube 60 is connected to a ground (or other reference potential) terminal through an inductor 68. Inductor 68 may advantageously comprise an inexpensive ferrite bead disposed in encompassing relation to the conductor 63 that connects the third electrode of gas tube 60 to ground. A small inductance is quite adequate. The right-hand side of protector 50, as seen in FIG. 5, is the secondary protection part of the circuit. It comprises a series circuit including a capacitor 64 and a bidirectional low voltage solid-state threshold device 65 connected from data conductor 21 to ground through a resistor 48. A similar series circuit comprising a capacitor 66 and a dual Zener diode 67 is connected between the other data signal conductor 22 and ground, again via resistor 48. The distance D between the primary and secondary portions of surge protector 50 is preferably at least about two meters.

The two low-voltage bidirectional solid-state threshold devices 65 and 67 should have much lower threshold voltages than the rating of the crowbar device, gas tube 60. Thus, if the discharge potential for device 60 is in a range of two to three hundred volts, then devices 65 and 67 may each have a breakdown voltage of between ten and seventy volts. The inductive reactance of coil 68 may be in a range of one to fifteen microhenries, with the capacitors 64 and 66 in a range of about 0.1 to 0.8 microfarads. Resistor 48 is typically about 0.1 to 0.5 ohms. These circuit parameters are typical, but other parameters may be .used, depending on the characteristics of the data transmission line to be protected.

The surge protector circuit 50 of FIG. 5 can be viewed as including two parallel-resonant L/C circuits, each including the crowbar device (gas tube 60) and the inductor 68. The first of these parallel resonant circuits includes coil 68 and capacitor 64; the other comprises capacitor 66 plus inductor 68. The principal function of inductor 68 in the primary/secondary surge protection circuit 50, FIG. 5, however, is the same as for inductor 41 in circuit 40, FIG. 3; it materially increases the time required to reduce a high voltage surge that renders gas tube 60 conductive to zero, and thereby increases the energy dissipation in the protection circuit. Thus, the overall operation of surge protector 50, for major voltage surges exceeding the breakdown voltage of gas tube 60, is essentially as described for protector 40; see FIG. 4.

For lower voltage surges on either or both of the data signal lines, the crowbar device 60 does not fire. These limited-amplitude electrical disturbances on the data conductors are bypassed to ground by the circuits of the secondary protection circuit, the right-hand portion of the surge protector 50. Thus, a pulse or surge on conductor 21, regardless of polarity, that exceeds the threshold voltage of device 65 but is below the breakdown potential of gas tube 60, goes to ground through capacitor 64 and device 65. Similarly, relatively low-voltage disturbances on conductor 22 are diverted to ground through capacitor 66 and the low threshold bidirectional device 67.

Figure 6:
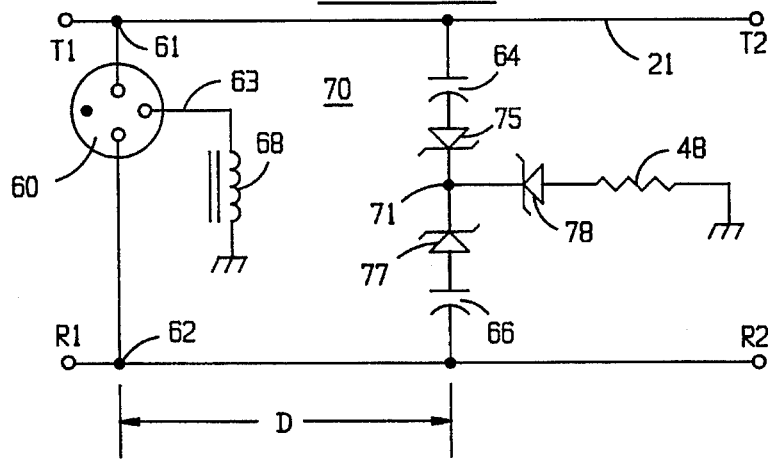

FIG. 6 illustrates a primary/secondary surge protector circuit 70 that is similar in construction and operation to the protector 50 of FIG. 5 but that may be slightly more economical to manufacture. The transmission line conductors 21 and 22, the terminals 61 and 62, the gas tube or other crowbar device 60, the inductor 68, the capacitors 64 and 66, and the ground connections, including conductor 63, remain the same in FIG. 6 as in FIG. 5. In protector circuit 70, however, capacitor 64 is connected to a terminal 71 by unidirectional threshold device, a Zener diode 77. A third Zener diode 78 connects terminal 71 to resistor 48 and thence to ground. This third diode 78 is connected in the circuit in opposed polarity to diodes 75 and 77. Thus, as shown, all three Zener diodes have their cathodes connected to terminal 71. The circuit would function in essentially the same way if the anodes of all of the three diodes 75,77 and 78 were connected to terminal 71. Protector 70, as noted, functions in the same way as protector 50, affording both primary (e.g., over two hundred volts) and secondary (e.g., over ten volts but well below two hundred volts) protection to the data transmission line, conductors 21 and 22. As before, the distance D should be two meters or more.

The primary/secondary protector circuit 80 shown in FIG. 7 includes the data transmission conductors 21 and 22, a part of the transmission line to be protected. The terminal 61 connects conductor 21 to an inductor 98A which is in turn connected to one electrode of a two-electrode crowbar device 90A. The other electrode of device 90A, shown as a gas tube, is connected to ground. The positions of inductor 98A and gas tube 90A in the circuit between conductor 21 and ground can be reversed with no real effect on operation of protector circuit 80. A similar series circuit, comprising an inductor 98B and two-electrode gas tube 90B, is connected from line 22, terminal 62, to ground. Again, the sequence of the circuit elements 90B and 98B can be reversed.

The secondary protector portion of circuit 80, FIG. 7, is similar to the protector 50 of FIG. 5. Thus, protector 80 includes a capacitor 64 in series with a bidirectional threshold device 65 between data conductor 21 and ground. A similar series circuit including a capacitor 66 and a dual Zener diode 67 connects data conductor 22 to ground line 23.

As thus far described, protector 80 of FIG. 7 is essentially similar to and operates in the same manner as protector 50, FIG. 5. The only difference is that there are two separate two-element gas tubes 90A and 90B; each serves as a crowbar device for one data signal conductor. There is a series inductor (98A, 98B) for each gas tube. The operation of the circuit of gas tube 90A is modified appreciably by inductor 98A; overall operation of the circuit of the other crowbar device 90B is similarly modified by inductor 98B. The low-voltage bidirectional threshold devices 65 and 67 serve the same purpose as before. Thus, if gas tubes 90A and 90B each have a breakdown voltage of about two hundred fifty volts, the threshold voltage for each of the devices 65 and 67 may typically be in a range of ten to seventy volts.

But protector circuit 80, FIG. 7, further comprises two additional bidirectional threshold devices 104 and 107. Device 104 is connected in parallel with capacitor 64, whereas device 106 is in parallel with the other capacitor 66. Devices 104 and 106 are provided primarily to protect capacitors 64 and 66 against surges which might overload the capacitors; they do not otherwise materially modify operation of protector 80. The series sequence of the circuits in the secondary portion of circuit 80 can, of course, be reversed without changing circuit operation. Thus, the parallel combination of capacitor 64 and device 104 can be connected to resistor 48, with device 65 connected to conductor 21, and a similar reversal can be made in the part of the secondary protection circuit connected to data conductor 22. As before, the spacing D is preferably two meters or more.

The protector circuit 100 illustrated in FIG. 8 is again applied to a section of a data transmission line including two data signal conductors 21 and 22 and a ground conductor 23. The primary portion of protector 100 includes two dual-electrode gas tubes 90A and 90B, connected to conductor terminals 61 and 62 respectively. In this circuit, however, both gas tubes are returned to the ground conductor 23 through one inductance 98. This one inductance replaces the two inductors 98A and 98B of FIG. 7.

Surge protection circuits 50,70 and 80, as described, are all symmetrical for both primary and secondary protection functions. The secondary portion of surge protector circuit 100, FIG. 8, is a bit different, but operation remains much the same. The primary side of the protector, gas tubes 90A and 90B, are connected to ground through a single inductor 98. On the secondary side, a capacitor 94 is connected to data line 21 and is returned to ground through two series-connected low-voltage bidirectional threshold devices 95 and 107 and the resistor 48. Data conductor 22, on the other hand, is connected to a capacitor 96 that is in turn connected to ground through only the one threshold device 107 and resistor 48; device 95 is not in this circuit. Surges on either or both data lines 21 and 22 are effectively dissipated in protector 100 in much the same way as explained above for other embodiments of the invention. The voltage threshold of device 95 should be much lower than for device 107, which in turn should be substantially less than the breakdown voltages of gas tubes 90A and 90B. Ratings of ten volts (for 95), sixty six volts (for 107) and two hundred volts (for 90A and 90B) are typical. The T and R connections of conductors 21 and 22 to the secondary (low voltage) part of the protector circuit 100 can be reversed with no change in operation.

FIG. 9 shows a primary/secondary protector circuit 110 that combines a primary surge protection section having two gas tubes 90A and 90B with just one series inductor 98, as in FIG. 8, with a secondary protector circuit including two capacitors 64,66 and three unidirectional threshold devices, Zener diodes 75,77 and 78, as in FIG. 6. As before, a small series resistor 48, typically about ten ohms, may be present in the ground circuit of the secondary protection circuit. Operation is as previously described for other embodiments of the invention.

Figure 10:
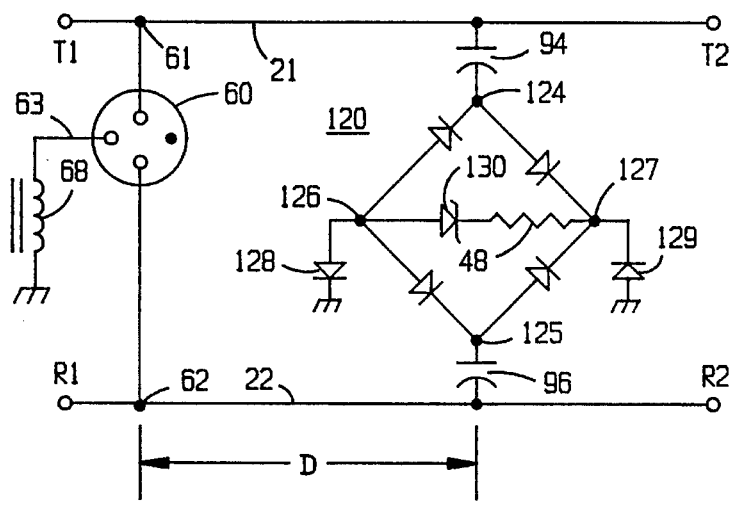

The surge protector circuit 120 shown in FIG. 10 incorporates features of some of the previously described embodiments of the invention, but introduces some additional circuit variations. Thus, the primary portion of surge protector circuit 120 includes a three-electrode crowbar device, the gas tube 60, having one electrode connected to a terminal 61 on data line 21, a second electrode connected to a terminal 62 on data conductor 22, and a third electrode returned to ground through a small inductance 68; this much is the same as FIG. 5. But the secondary side of protector circuit 120 comprises a four diode bridge having anode-cathode terminals 124 and 125, an anode—anode terminal 126, and a cathode—cathode terminal 127. A capacitor 94 is connected from bridge terminal 124 to data conductor 21; a capacitor 96 couples terminal 125 to conductor 22. Bridge terminals 126 and 127 are returned to ground via blocking diodes 128 and 129, respectively. A Zener diode or like threshold device 130 is connected across bridge terminals 127 and 127, in series with the small resistor 48.

The primary/secondary protector circuit 120, FIG. 10, looks somewhat like a combination of one of the protectors of FIGS. 5 and 6 with the prior art bridge of FIG. 1, but it is not. There is no high-breakdown crowbar device connected into the bridge of FIG. 10. Moreover, protector circuit 120 incorporates the inductor 68 in the part of the circuit that protects data signal conductor 21 high voltage surges to slow down the action of the primary protection circuit and gain increased energy dissipation as in the other embodiments of the invention. The bridge circuit in the secondary part of protector 120, FIG. 10, provides the same secondary protection as in prior embodiments of the invention, but with a large number (six) of inexpensive blocking diodes and only one threshold device, the relatively inexpensive Zener diode 130. As in other embodiments of the invention, including FIGS. 8 and 9, distance D should be two meters or more.

Figure 11:
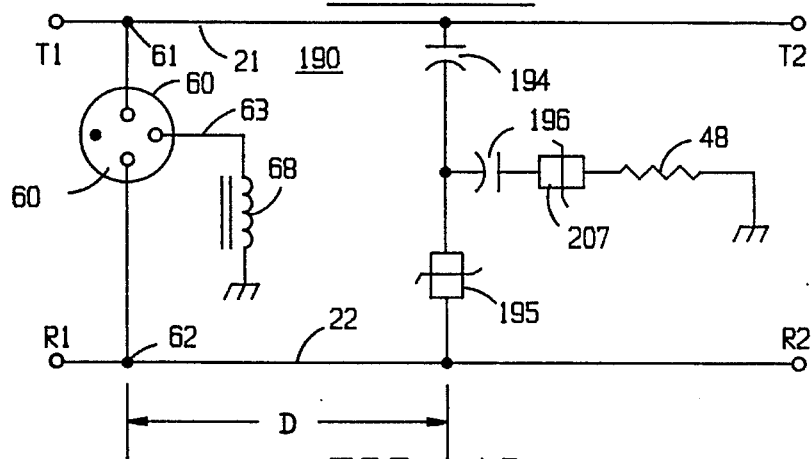

FIG. 11 illustrates a combined primary/secondary protection circuit 120 for a data transmission line comprising the conductors 21 and 22. The primary protection portion of circuit 190, at the left-hand side of FIG. 11, is the same as in FIGS. 5 and 10 and includes the high voltage breakdown device 60, shown as a gas tube, with two of its electrodes connected to terminal 61 on line 21 and to terminal 62 on line 22. Device 60 is a three-electrode gas tube; the third electrode is returned to ground through a small inductance 68. Inductor 68, as in other embodiments of the invention, may be effectively and economically provided by a small ferrite bead disposed in encompassing relation to the conductor 63 from the third electrode of the gas tube to ground.

The secondary protection circuit of the right-hand side of protector 190, FIG. 11, is generally similar to the corresponding portion of FIG. 8 but with the components arranged somewhat differently. Thus, two capacitors 194 and 196 are connected in series with each other and in series with a bidirectional threshold device 207 that is returned to ground through a small resistor 48. For line 22, the arrangement is slightly different; a bidirectional low-voltage threshold device 195 is connected to line 22 and is connected to the common junction of capacitors 196. It is thus seen that the components are essentially the same as in FIG. 8 but that the circuit connection is slightly different. In the preferred construction, threshold device 207 should have a rating of the order of sixty to seventy volts, assuming that gas tube 60 has a rating of about two hundred fifty volts. Device 195, however, should be at a substantially lower rating as, for example, ten volts. The basic operation of the circuit of FIG. 11 is generally similar to FIGS. 5 and 8 and hence need not be described in detail. As in other embodiments, the distance D between the primary and secondary portions of the protector 190 is preferably two meters or more.

Figure 12:
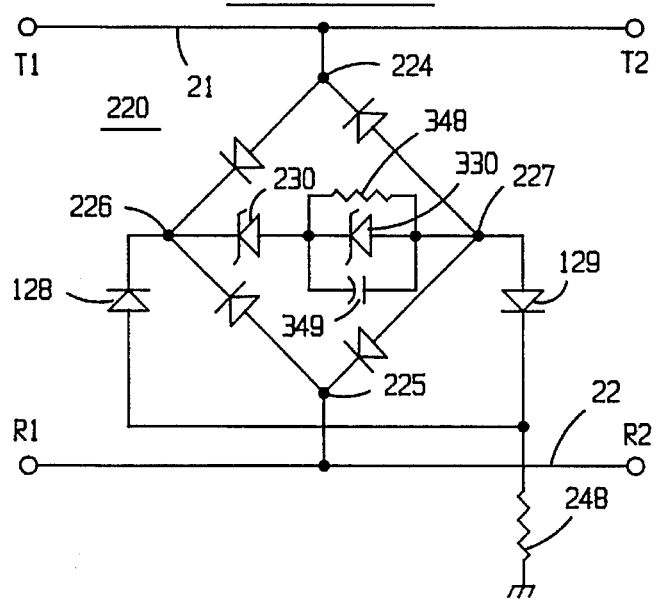

The circuit of FIG. 12 comprises a primary/secondary protection circuit 220 that incorporates may of the features of protector 120 of FIG. 10 but in a distinctively different arrangement particularly as regards the primary protection aspect of the circuit. Thus, the primary/secondary protector 220 includes a four-diode bridge circuit having an anode-cathode terminal 224 connected to the data conductor 21 of the transmission line and another anode-cathode terminal 225 connected to the other data conductor 22. The cathode—cathode terminal 226 of the bridge is connected to a blocking diode 128 that is returned to ground through a small resistor 248. The anode—anode terminal 227 of the bridge is connected to ground through the series combination of another blocking diode 129 and resistor 248. Resistor 248 may be replaced by a low voltage bidirectional threshold device in some variations of the protector circuit.

The main breakdown and threshold components of protection circuit 220 are connected across terminals 226 and 227 of the bridge. Thus, terminal 226 is connected to a low-voltage threshold device 230 (e.g., sixty volts) which may comprise a Zener diode or an avalanche diode. Device 230 is in series with a high voltage breakdown device 330, having a voltage rating of about 250 volts; this device 330 may, for example, be a thyristor. A resistor 348 is connected in parallel with the thyristor 330 and a capacitor 349 is also connected in parallel with the breakdown device.

For circuit 220, the voltage that would be able to pass on a DC basis between terminals 226 and 227 is the sum of the voltages of the threshold device 230 and the breakdown device 330. That the diodes of the bridge in circuit 220 and the low-voltage threshold device 230 can handle these currents is due to the ratings selected for the devices in this protector. Thus, the thyristor 330 will fall short at some level above one hundred amperes whereas the bridge diodes will fail at currents in excess of about one hundred twenty amperes. Assuming that threshold device 230 is an avalanche diode, it will handle currents up to about one hundred fifty amperes and, of course, will fall short when the energy exceeds its capabilities. Resistor 348 is incorporated in the circuit to discharge any stored charge on capacitor 349. Resistor 248, or an avalanche diode if used, should be employed when the induced voltage on the transmission line is relatively high.

Figure 13:
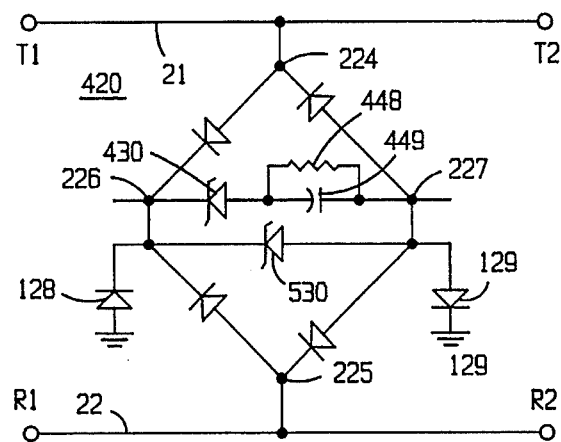

FIG. 13 illustrates yet another primary/secondary protection circuit 420 for the transmission line, again shown as comprising two data conductors 21 and 22. Circuit 420 includes a diode bridge having one anode-cathode terminal 224 connected to conductor 21 and the other such terminal 225 connected to conductor 22. The dual cathode terminal 226 of the bridge is returned to ground through a blocking diode 128 and the dual anode terminal 227 is returned to ground through a blocking diode 129. The ground connections can include a resistor or additional threshold device as described in connection with FIG. 12.

In circuit 420 there is a high voltage breakdown device, preferably a thyristor 430, connected between bridge terminals 226 and 227. Device 430 affords primary protection. The secondary protector circuit includes a low-voltage threshold device 430 connected in series with the parallel combination of a resistor 448 and a capacitor 449. The overall performance of circuit 420 of FIG. 13 is quite similar to that of protector 220 of FIG. 12.

Figure 14:
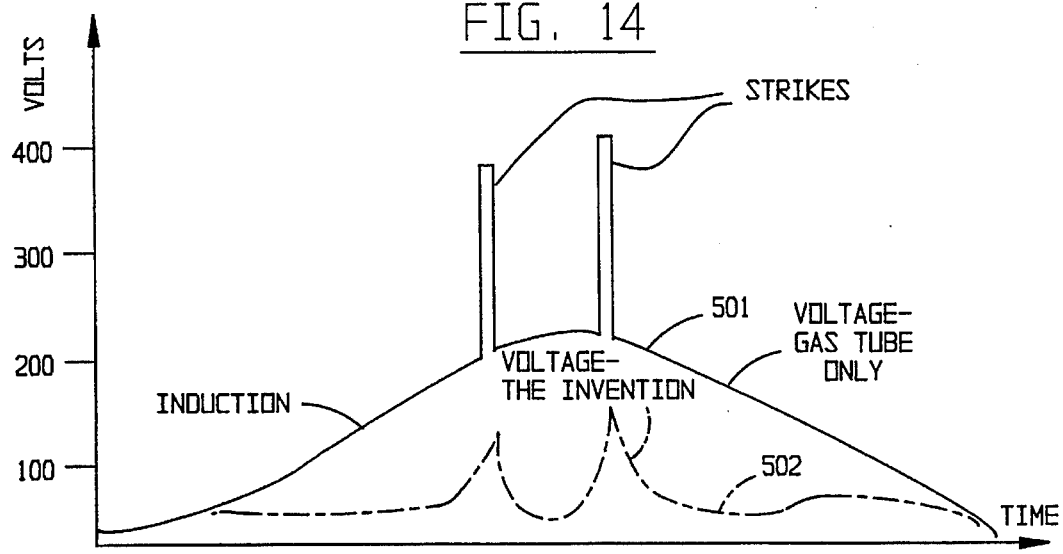
FIGS. 14 and 15 are graphs used to explain operational features of the invention.
Figure 15:
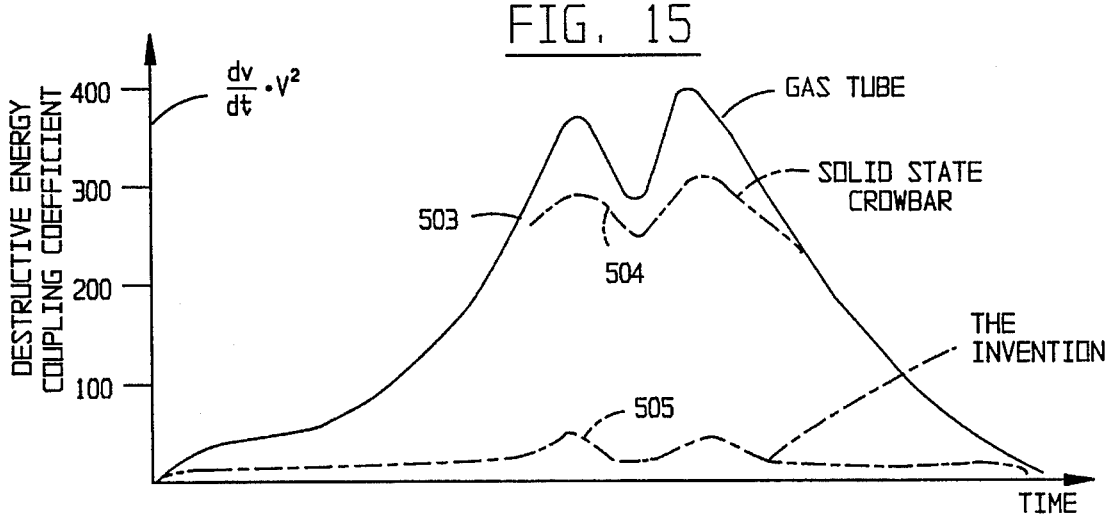

FIGS. 14 and 15 illustrate graphically the difference in operation between the surge protection circuits of the present invention and previously known protectors, particularly those providing primary protection only. As seen by curve 501 in FIG. 14, during a storm a substantial voltage is induced on the transmission line, and the voltage rises in a sharp peak in the event of a lightning strike on the line or immediately adjacent to the line. In contrast, the voltage on the data line is held to a much lower value, indicated by the phantom curve 502 in FIG. 14, by the combination primary/secondary protection circuits of the invention. In FIG. 15 the destructive energy coupling coefficient for the same storm situation is illustrated by the solid curve 503, representative of a primary protector using a gas tube only. The dash line curve 504 illustrates the coefficient variations during the storm for a solid-state crowbar protector circuit that does not include the features of the invention. The phantom line curve 505 shows the variations in the same coefficient for combination primary/secondary circuits incorporating the features of the invention.

In the circuits of FIGS. 3 and 5–13, as previously noted, the breakdown or crowbar devices 30,60,90A,90B,330, and 530 may all comprise gas discharge tubes, solid-state triacs, thyristors, or other such devices having predetermined breakdown voltages that are relatively high, preferably in a range of approximately two hundred to three hundred volts. The secondary threshold devices 43,65,67,75,77,78,95,104, 106,107,130,230 and 430, on the other hand, should each have a substantially lower threshold voltage; a range of approximately ten to seventy volts for the threshold rating of each of these devices is appropriate. The inductive reactances 41,68,98,98A and 98B may be in a range of approximately one to fifteen microhenries. For each, a small ferrite bead or the like encompassing a conductor will provide the necessary inductance. The capacitors 42,64,66,94,194,196, 349 and 449 may be within a range of approximately 0.1 to 0.8 microfarads. It should be understood that these circuit parameters are provided by way of illustration and not as a limitation on the basic invention. Typically, resistors such as components 48,248, 348, and 448 are about 0.1 to 0.5 ohms. The bridge and blocking diodes are all high voltage devices, but can be quite inexpensive; a wide variety of such diodes is available.

The surge protector 40 of FIG. 3 is essentially a primary surge protector, though it provides some secondary (low voltage) protection. That is, protector 40 serves primarily to protect the data signal conductors and other equipment on the line against damage from surges exceeding the breakdown voltage of its "crowbar" device 30, usually in a range of two to three hundred volts. This is also true of protection circuits 220 and 420, FIGS. 12 and 13. All of these circuits, however, do afford some secondary protection for lower voltages since each includes a threshold circuit as well as a breakdown circuit.

In each of the protectors 50,70,80,100,110,120 and 190 of FIGS. 5–11, however, the primary, high voltage surge protection is more effectively combined with a secondary protection circuit functioning at a substantially lower surge level. Thus, in protector 50 of FIG. 5 the high voltage (primary) surge protection is provided by the crowbar device of the circuit, gas tube 60, in conjunction with inductor 68. But protection against voltage surges at lower voltages, and other secondary over-voltage conditions, is provided by the threshold devices 65 and 67 and capacitors 64 and 66. Thus, FIG. 5 shows both a complete protector circuit 50, including protection at both primary and secondary surge levels, and a secondary protector that could be used independently of the overall circuit. This applies to each of FIGS. 6–11 as well. In most embodiments of the invention, when functioning to protect the data transmission line against high voltage surges (over two hundred volts) the return of the data conductor(s) to a near zero voltage level is materially delayed by the inductor or inductors associated with the crowbar device(s), affording improved protection performance as compared with known primary protectors. Moreover, the secondary protector circuits of the invention do not include any appreciable resistance in any of the data signal conductors.

I claim:

1. A surge protector for a data transmission line including a data signal conductor, the surge protector comprising:

a normally non-conductive "crowbar" device that becomes conductive when subjected to a predetermined breakdown voltage;

connector means for connecting the crowbar device between the data signal conductor and a reference potential in a circuit configuration such that, in the event of a voltage surge exceeding the breakdown voltage on the data signal conductor, the crowbar device is driven conductive and establishes a low impedance path from the data signal conductor through the crowbar device to the reference potential;

and an inductive reactance connected to the crowbar device, in series with the crowbar device in the low impedance path, to materially increase the effective impedance in that path for a brief interval after the crowbar device is driven conductive;

the surge protector including no appreciable resistance in series with the data signal conductor.

2. A surge protector for a data transmission line, according to claim 1, in which the inductive reactance is a ferrite bead disposed in encompassing relation to a conductor that is a part of the connecting means.

3. A surge protector for a data transmission line, according to claim 1, in which the inductive reactance is connected between the crowbar device and the data signal conductor.

4. A surge protector for a data transmission line, according to claim 3, in which the inductive reactance is a ferrite bead disposed in encompassing relation to a conductor that is a part of the connecting means.

5. A surge protector for a data transmission line, according to claim 1, in which the inductive reactance is connected between the crowbar device and the reference potential.

6. A surge protector for a data transmission line, according to claim 5, in which the inductive reactance is a ferrite bead disposed in encompassing relation to a conductor that is a part of the connecting means.

7. A surge protector for a data transmission line, according to claim 1, and further comprising:

a capacitor connected in parallel with the series combination of the inductive reactance and the crowbar device.

8. A surge protector for a data transmission line, according to claim 7, and further comprising:

a normally non-conductive threshold device, connected in series with the capacitor, the threshold device having a threshold voltage substantially smaller than the breakdown voltage of the crowbar device.

9. A surge protector for a data transmission line, according to claim 8, in which:

the crowbar device has a breakdown voltage in a range of approximately two hundred to three hundred volts; and the threshold device has a threshold voltage in a range of approximately ten to seventy volts.

10. A surge protector for a data transmission line, according to claim 9, in which:

the inductive reactance is in a range of approximately one to fifteen microhenries; and the capacitor is in a range of approximately 0.1 to 0.8 microfarads.

11. A surge protector for a data transmission line, according to claim 10, in which the inductive reactance is a ferrite bead disposed in encompassing relation to a conductor that is a part of the connecting means.

12. A surge protector for a data transmission line, according to claim 1, in which the data transmission line includes first and second data signal conductors, and in which:

the connector means comprises a diode bridge having first and second anode-cathode terminals, a third anode—anode terminal, and a fourth cathode—cathode terminal;

each of the first and second bridge terminals is connected to one of the signal conductors;

each of the third and fourth bridge terminals is connected to the reference potential through a blocking diode; and the crowbar device and the inductive reactance are connected in series with each other across the third and fourth bridge terminals so that the surge protector protects both signal conductors.

13. A surge protector for a data transmission line, according to claim 12, in which:

a capacitive reactance is connected in parallel with the series combination of the inductive reactance and the crowbar device.

14. A surge protector for a data transmission line, according to claim 13, and further comprising:

a normally non-conductive threshold device, connected in series with the capacitive reactance, the threshold device having a threshold voltage substantially smaller than the breakdown voltage of the crowbar device.

15. A surge protector for a data transmission line, according to claim 14, in which:

the crowbar device has a breakdown voltage in a range of approximately two hundred to three hundred volts; and the threshold device has a threshold voltage in a range of approximately ten to seventy volts.

16. A surge protector for a data transmission line, according to claim 15, in which:

the inductive reactance is in a range of approximately one to fifteen microhenries; and the capacitive reactance is in a range of approximately 0.1 to 0.8 microfarads.

17. A surge protector for a data transmission line, according to claim 16, and further comprising a resistor connected in parallel with the capacitive reactance.

18. A surge protector for a data transmission line, according to claim 17 and further comprising a small resistor connected in series with the threshold device and the capacitative reactance.

19. A surge protector for a data transmission line, according to claim 15, in which the inductive reactance is a ferrite bead disposed in encompassing relation to a conductor that is a part of the connecting means.

20. A surge protector for a data transmission line, according to claim 1, in which the data transmission line includes first and second data signal conductors, and in which:

the crowbar device has first, second, and third electrodes;

the connector means connects the first and second electrodes of the crowbar device to the first and second data signal conductors, respectively; and the connector means connects the inductive reactance between the third electrode of the crowbar device and the reference potential.

21. A surge protector for a data transmission line, according to claim 20, and further comprising:

a first capacitor connected from the first data line to the reference potential; and a second capacitor connected from the second data line to the reference potential.

22. A surge protector for a data transmission line, according to claim 21, and further comprising:

first and second normally non-conductive threshold devices, connected in series with each other between the first and second capacitors and connected to the reference potential, the threshold devices each having a threshold voltage substantially lower than the breakdown voltage of the crowbar device.

23. A surge protector for a data transmission line, according to claim 22 and further comprising a small resistor in series in the circuit, including a threshold device, between each data conductor and the reference potential.

24. A surge protector for a data transmission line, according to claim 22, in which each threshold device is a bidirectional threshold device.

25. A surge protector for a data transmission line, according to claim 22, in which the connections of the data lines to the capacitors are displaced by a distance of two meters or more from the connections of the data lines to the crowbar device.

26. A surge protector for a data transmission line, according to claim 25, in which each threshold device is a bidirectional threshold device.

27. A surge protector for a data transmission line, according to claim 26 and further comprising a small resistor in series in the circuit, including a threshold device, between each data conductor and the reference potential.

28. A surge protector for a data transmission line, according to claim 24, in which:

both threshold devices are connected in series with each other between the first capacitor and the reference potential; and the second threshold device is connected in series between the second capacitor and the reference potential.

29. A surge protector for a data transmission line, according to claim 28, in which the connections of the data lines to the capacitors are displaced by a distance of two meters or more from the connections of the data lines to the crowbar device.

30. A surge protector for a data transmission line, according to claim 23, and further comprising:

third and fourth normally non-conductive threshold devices connected in parallel with the first and second capacitors, respectively.

31. A surge protector for a data transmission line, according to claim 30, in which each threshold device is a bidirectional threshold device.

32. A surge protector for a data transmission line, according to claim 31, in which the connections of the data lines to the capacitors are displaced by a distance of two meters or more from the connections of the data lines to the crowbar device.

33. A surge protector for a data transmission line, according to claim 31 and further comprising a small resistor in series in the circuit, including a threshold device, between each data conductor and the reference potential.

34. A surge protector for a data transmission line, according to claim 22, in which:

the crowbar device has a breakdown voltage in a range of approximately two hundred to three hundred volts; and the threshold device has a threshold voltage in a range of approximately ten to seventy volts.

35. A surge protector for a data transmission line, according to claim 24, in which:

the inductive reactance is in a range of approximately one to fifteen microhenries; and each capacitor is in a range of approximately 0.1 to 0.8 microfarads.

36. A surge protector for a data transmission line, according to claim 35 and further comprising a small resistor in series in the circuit, including a threshold device, between each data conductor and the reference potential.

37. A surge protector for a data transmission line, according to claim 35, in which the connections of the data lines to the capacitors are displaced by a distance of two meters or more from the connections of the data lines to the crowbar device.

38. A surge protector for a data transmission line, according to claim 20, and further comprising:
 a blocking diode bridge having first and second anode-cathode terminals, a third anode—anode terminal, and a fourth cathode—cathode terminal;
 two blocking diodes external to the bridge,
 each of the first and second bridge terminals being connected to one of the capacitors and each of the third and fourth bridge terminals being connected to the reference potential through one of the external blocking diodes; and
 a normally non-conductive threshold device connected across the third and fourth bridge terminals, the threshold device having a threshold voltage substantially lower than the breakdown voltage of the crowbar device.

39. A surge protector for a data transmission line, according to claim 28, in which:
 the crowbar device has a breakdown voltage in a range of approximately two hundred to three hundred volts; and
 the threshold device has a threshold voltage in a range of approximately ten to seventy volts.

40. A surge protector for a data transmission line, according to claim 39, in which:
 the inductive reactance is in a range of approximately one to fifteen microhenries; and
 each capacitor is in a range of approximately 0.1 to 0.8 microfarads.

41. A surge protector for a data transmission line, according to claim 38, in which the connections of the data lines to the capacitors are displaced by a distance of two meters or more from the connections of the data lines to the crowbar device.

42. A surge protector for a data transmission line, according to claim 38 and further comprising a small resistor in series in the circuit, including a threshold device, between each data conductor and the reference potential.

43. A surge protector for a data transmission line, according to claim 38, in which the inductive reactance is a ferrite bead disposed in encompassing relation to a conductor that is a part of the connecting means.

44. A surge protector for a data transmission line including first and second data signal conductors, the surge protector comprising:
 first and second normally non-conductive "crowbar" devices each of which becomes conductive when subjected to a predetermined breakdown voltage;
 connector means for connecting each crowbar device between one of the data signal conductors and a reference potential in a circuit configuration such that, in the event of a voltage surge exceeding the breakdown voltage on the one data signal conductor to which it is connected, each crowbar device is driven conductive and establishes a very low impedance path from its associated data signal conductor to the reference potential;
 and an inductive reactance connected in series in each of the low impedance paths to materially increase the effective impedance in the path established by that crowbar device from its associated data signal conductor to the reference potential for a brief interval after the crowbar device is driven conductive;
 the surge protector including no appreciable resistance in series with either data conductor.

45. A surge protector for a data transmission line, according to claim 44, in which the inductive reactance is a ferrite bead disposed in encompassing relation to a conductor that is a part of the connecting means.

46. A surge protector for a data transmission line, according to claim 45, and further comprising:
 first and second capacitors, connected from the first data signal conductor and the second data signal conductor, respectively, to ground.

47. A surge protector for a data transmission line, according to claim 46, in which the inductive reactance comprises two inductors, each connected between one crowbar device and the associated data signal conductor.

48. A surge protector for a data transmission line, according to claim 46, in which the inductive reactance is connected between each crowbar device and the reference potential member.

49. A surge protector for a data transmission line, according to claim 48, in which the inductive reactance is one inductor.

50. A surge protector for a data transmission line, according to claim 49, in which the inductive reactance is a ferrite bead disposed in encompassing relation to a conductor that is a part of the connecting means.

51. A surge protector for a data transmission line, according to claim 46, and further comprising:
 first and second normally non-conductive threshold devices, each connected in series between at least one of the capacitors and the reference potential, each threshold,device having a threshold voltage substantially smaller than the breakdown voltage of the crowbar devices.

52. A surge protector for a data transmission line, according to claim 51, in which:
 each crowbar device has a breakdown voltage in a range of approximately two hundred to three hundred volts; and
 each threshold device has a threshold voltage in a range of approximately ten to seventy volts.

53. A surge protector for a data transmission line, according to claim 52, in which:
 each inductive reactance is in a range of approximately one to fifteen microhenries; and
 each capacitor is in a range of approximately 0.1 to 0.8 microfarads.

54. A surge protector for a data transmission line, according to claim 46, in which the connections of the data lines to the capacitors are displaced by a distance of two meters or more from the connections of the data lines to the crowbar devices.

55. A surge protector for a data transmission line, according to claim 44, and further comprising:
 a blocking diode bridge having first and second anode-cathode-terminals, a third anode—anode terminal, and a fourth cathode—cathode terminal;
 two blocking diodes external to the bridge, each of the first and second bridge terminals being connected to one of the reactive capacitances and each of the third and fourth bridge terminals being connected to the reference potential member through one of the two blocking diode external to the bridge; and a normally non-conductive threshold device connected across the third and fourth bridge terminals, the threshold device having a threshold voltage substantially lower than the breakdown voltage of the crowbar device.

56. A surge protector for a data transmission line, according to claim 55, in which:

the crowbar device has a breakdown voltage in a range of approximately two hundred to three hundred volts; and the threshold device has a threshold voltage in a range of approximately ten to seventy volts.

57. A surge protector for a data transmission line, according to claim 56, in which:

the inductive reactance is in a range of approximately one to fifteen microhenries; and the capacitor is in a range of approximately 0.1 to 0.8 microfarads.

58. A secondary surge protector for a data transmission line including first and second data signal conductors, the secondary surge protector comprising:

first and second capacitors connected to the first and second data signal conductors, respectively;

first and second normally non-conductive threshold devices, each having a threshold voltage in a range of approximately ten to seventy volts;

and means for connecting each threshold device in series with at least one of the capacitors in a circuit connected to a reference potential;

the secondary surge protector including no appreciable resistance in series with either data signal conductor.

59. A surge protector for a data transmission line, according to claim 58, and further comprising a small resistor connected in series between each capacitor and the reference potential.

60. A secondary surge protector for a data transmission line, according to claim 58, in which each threshold device is a bidirectional threshold device.

61. A secondary surge protector for a data transmission line, according to claim 58 and further comprising two additional, bidirectional threshold devices, each connected in parallel with one of the capacitors.

62. A secondary surge protector for a data transmission line, according to claim 58, and further comprising a third threshold device having a threshold level in a range of approximately ten to seventy volts;

all of the threshold devices being unidirectional threshold devices;

the first and third threshold devices being connected in opposed polarity, in series relation, between the first capacitor and the reference potential; and the second and third threshold devices being connected in opposed polarity, in series relation, between the second capacitor and the reference potential.

63. A combined primary/secondary surge protector for a data transmission line including first and second data signal conductors, the surge protector comprising:

a blocking-diode bridge having first and second anode-cathode terminals, a third anode—anode terminal, and a fourth cathode—cathode terminal;

two blocking diodes external to the bridge;

each of the first and second bridge terminals being connected to one of the data signal conductors and each of the third and fourth bridge terminals being connected to a reference potential through one of the two external blocking diodes;

a normally non-conductive threshold device connected across the third and fourth bridge terminals, the threshold device having a threshold voltage approximately in the range of ten to seventy volts; and a normal non-conductive crowbar device connected across the third and fourth bridge terminals, the crowbar device having a breakdown voltage approximately in the range of two hundred to three hundred volts;

the surge protector including no appreciable resistance in series with either data conductor.

64. A surge protector for a data transmission line, according to claim 63 and further comprising:

a parallel resistor and capacitor circuit connected in series with the threshold device.

65. A surge protector for a data transmission line, according to claim 64 in which the crowbar device is in series with the threshold device and in parallel with the resistor and capacitor circuit.

66. A surge protector for a data transmission line, according to claim 64 in which the crowbar device is in parallel with the threshold device.

67. A surge protector for a data transmission line, according to claim 64 in which each of the blocking diode circuits from each of the third and fourth bridge terminals to the reference potential includes, in series, a small resistor.

68. A surge protector for a data transmission line, according to claim 64 in which each of the blocking diode circuits from each of the third and fourth bridge terminals to the reference potential includes, in series, an additional threshold device.

* * * * *